United States Patent [19]

Kuhn

[11] 4,079,444
[45] Mar. 14, 1978

[54] D.C. TO A.C. ELECTRONIC INVERTER WITH OVERLOAD PROTECTION

[75] Inventor: John J. Kuhn, Allison Park, Pa.

[73] Assignee: Westinghouse Air Brake Company, Swissvale, Pa.

[21] Appl. No.: 673,872

[22] Filed: Apr. 5, 1976

[51] Int. Cl.² .......................................... H02H 7/122
[52] U.S. Cl. .................................................... 363/56
[58] Field of Search ......................... 321/2, 14, 45 R; 363/24, 55, 56

[56] References Cited

U.S. PATENT DOCUMENTS

| | | | |
|---|---|---|---|
| 3,200,348 | 8/1965 | Kammiller et al. ..................... | 321/14 |
| 3,284,696 | 11/1966 | Nagata et al. ............................ | 321/2 |
| 3,743,887 | 7/1973 | Keough et al. ......................... | 321/14 |
| 3,832,623 | 8/1974 | Boyden et al. ..................... | 321/45 R |
| 3,875,483 | 4/1975 | Farr ................................... | 321/45 R |
| 3,875,496 | 4/1975 | Carsten ............................. | 321/45 R |
| 3,999,113 | 12/1976 | McCoy .................................... | 321/2 |

*Primary Examiner*—William H. Beha, Jr.
*Attorney, Agent, or Firm*—J. B. Sotak; R. W. McIntire, Jr.

[57] ABSTRACT

A solid-state inverter having a programmed unijunction transistor oscillator for converting a d.c. supply voltage into a.c. oscillations which trigger a bistable transistor multivibrator for producing square-wave signals which are applied to a compound-connected transistor amplifier for energizing a load and having an overload protection circuit which disables the compound-connected transistor amplifier and which, in turn, deenergizes the load during the presence of an overload condition.

21 Claims, 2 Drawing Figures

D.C. TO A.C. ELECTRONIC INVERTER WITH OVERLOAD PROTECTION

FIELD OF THE INVENTION

This invention relates to an improved electronic inverting circuit for converting a d.c. input voltage into an a.c. output voltage and, more particularly, to an automatic transistorized d.c. to a.c. inverter utilizing a free running oscillator powered by a source of d.c. battery potential to produce triggering pulses for a bistable multivibrator which generates square-wave signals which are fed to a multistage amplifier for amplification and application to an output transformer and employing an overload protection circuit which senses the amount of current being drawn from the source of d.c. battery potential and which causes the multistage amplifier to be disabled when an excess amount of current is drawn from the source of d.c. battery potential and subsequently causes the multistage amplifier to be enabled when excess amount of current is no longer being drawn from the source of d.c. battery potential.

BACKGROUND OF THE INVENTION

In various of solid-state or semiconductive circuits, it is necessary to protect the sensitive elements, such as the transistors and the like, against damage and destruction during overload conditions. For example, transistors and other semiconductive circuit components must be protected from applied potentials which are in excess or are greater than the maximum values and designated tolerable characteristics of each of the given element. Thus, the voltages applied across the various electrodes and the current flowing through the various junctions should not exceed the design values given by the manufacturer. It will be appreciated that this protection should include both transient voltage surges and overload conditions which may be caused by the collapsing of a magnetic field of the shorting or opening of circuit elements. An acute problem has been found to exist in electronic power inverters or d.c. to a.c. converters employed as standby power supplies or sole power sources for carrier equipment, train graphs, meters and track circuits in railroad or mass and/or rapid transit operations. In such inverter or converter circuits, protection is especially required against overcurrent demands on the d.c. supply voltage caused by the load or output circuit. The overload condition can be the result of a short-circuited output or an increased current demand by the load in excess of what the circuit was designed to handle. Thus, it is highly advantageous to readily sense and detect an overload condition and to immediately cut off the supply of current to the output circuit. It is further desirable to permit the oscillating section of the circuit to continue to function since a delay period is incurred in restarting the production of the a.c. oscillations and to simply interrupt the load circuit by disabling the output amplifying section of the circuit. Moreover, it is advantageous during momentary and temporary overload failures to quickly and automatically reset or reestablish the converting operation of the electronic inverter so that power is promptly reapplied to the load.

OBJECTS OF THE INVENTION

Accordingly, it is an object of this invention to provide an improved electronic inverter having overload protective apparatus.

Another object of this invention is to provide an overload protection arrangement for an inverting circuit which converts a d.c. input voltage into a.c. output signals.

A further object of this invention is to provide an electronic d.c. to a.c. converter having an overcurrent sensing and disabling arrangement.

Yet another object of this invention is to provide a unique overload protecting circuit arrangement for a d.c. to a.c. converter.

Yet a further object of this invention is to provide a novel current sensing apparatus responsive to an overload condition for disabling an output amplifier of a transistorized inverting circuit.

Still another object of this invention is to provide a new sensing and disabling circuit for a solid-state converter for detecting when excessive current is being drawn from a d.c. battery source to deenergize the load.

Still another object of this invention is to provide an electronic inverter for converting a d.c. input to an a.c. output having means coupled to a source of d.c. supply voltage for generating a.c. oscillations, means coupled to the oscillation generating means for producing a.c. signals having a frequency which is a fraction of the frequency of the a.c. oscillations, means coupled to the a.c. signal producing means for amplifying the a.c. signals and for producing an a.c. output, and means coupled to the source of d.c. supply voltage for sensing the amount of current flowing therefrom and for disabling the amplifying means when the amount of current flowing from the source of d.c. supply voltage exceeds a predetermined value.

An additional object of this invention is to provide an electronic converter having means coupled to a d.c. battery source for generating a.c. oscillations, means coupled to the oscillation generating means for producing a.c. signals having a frequency which is a function of the frequency of the a.c. oscillations, and means coupled to the signal producing means for amplifying the a.c. signals and for producing an a.c. output, characterized by means coupled to the d.c. battery source for detecting the amount of current flowing therefrom, and means coupled to the amplifying means for deenergizing the amplifying means thereby precluding the producing of the a.c. output during an overload condition.

SUMMARY OF THE INVENTION

In accordance with the present invention, the solid-state inverter utilizes a transistor relaxation oscillating circuit, a bistable transistor multivibrating circuit, a compound connected transistor amplifying circuit, and an overload protection circuit for converting d.c. battery voltage into an a.c. output voltage. The relaxation oscillating circuit includes a programmed unijunction transistor which is powered by the d.c. voltage of a battery to produce a.c. oscillations. The oscillator includes a pair of negative temperature coefficient diodes for temperature compensation and also a current-limiting resistor and a Zener diode for providing immunity to battery voltage variations. The output of the oscillator is connected to the flip-flop multivibrator which includes a pair of PNP transistors connected to a common-emitter configuration. The a.c. oscillations trigger the multivibrator so that square-wave signals are derived on the collector electrodes of the PNP transistors. The frequency of the square-wave signals is a fraction, namely, one-half, of the frequency of the a.c. oscillations. The square-wave signals are applied to the intput of a pair of PNP transistor input stages of the compound connected amplifying circuit. The outputs of the input stage are coupled to the inputs of a pair of intermediate PNP transistor stages, the outputs of which are coupled to the inputs of a pair of PNP transistor output power stages. Under normal conditions, the amplified a.c. output signals are derived from the power transistors and are transformer coupled to an a.c. load. The overload protection circuit includes an electromagnetic reed relay, an integrated circuit operational amplifier comparator and a NPN switching transistor. The electromagnetic relay includes a multi-turn inductive monitoring coil which is serially connected to the d.c. battery to sense or detect the amount of current being drawn from the battery. The inductive coil surrounds and magnetically influences an electrical reed contact which is connected to one of the two inputs of the operational amplifier. The other input of operational amplifier is connected to a point of reference potential. The operational amplifier is normally turned on and its output is connected to the input of the transistor switching circuit. The output of the switching transistor is connected to the pair of input stages of the compound transistor amplifier and completes a circuit path to ground when the switching transistor is in a conductive condition so that a.c. output signals are available at the load. However, when an overload condition occurs, a disabling action takes place. That is, when an abnormal demand by the load occurs or when the load becomes short-circuited, an excess amount of current will be supplied by the battery. The inductive coil senses the increase in current flow and at a predetermined value, which is determined by the number of turns of the inductive coil, the magnetic flux produced by the coil and other parameters will cause the reed contact to be attached and to be closed. The closing of the reed contact causes the voltage on the one input of the integrated circuit operational amplifier to rise to a predetermined level to toggle the operational amplifier and to turn it to an off condition. The turning off of the operational amplifier causes the switching transistor to switch to a nonconductive condition. The nonconduction of the switching transistor interrupts the circuit path to ground of the pair of input stages of the compound transistor amplifier so that the a.c. output signals are no longer delivered to the load. Thus, the load is effectively disconnected so that the current demand of the battery is quickly reduced. The reduction of current flow causes a decrease in the magnetic flux produced by the coil of the electromagnetic relay. When the flux decreases sufficiently, the reed contact will again become open so that the voltage on the one input of the operational amplifier begins to decay. When the voltage decays sufficiently, the operational amplifier will toggle to its original condition, namely, operational amplifier will turn on. The turning on of the operational amplifier causes the conduction of the switching transistor which, in turn, results in the reestablishment of the circuit path to ground for the pair of input stages of the compound connected amplifier. Ergo, the square-wave signals are again amplified and are transformer coupled to energize the load. If the overload condition is still present, the excessive current demand will again cause the reed contact to open and the load will be deenergized in the manner as described above. However, if the overload condition is no longer present, the load will remain energized and the inverter will operate in the normal manner. A bridge rectifier network including Zener diode is connected to the primary winding of the output transformer to prevent surges and transients from damaging the sensitive semiconductive elements or components.

DESCRIPTION OF THE DRAWINGS

The foregoing objects and other attendant features and advantages will be more readily apparent and appreciated as the subject invention becomes more clearly understood by reference to the following detailed description when considered in conjunction with the accompanying drawings wherein.

DESCRIPTION OF A PREFERED EMBODIMENT

Figure 1A:
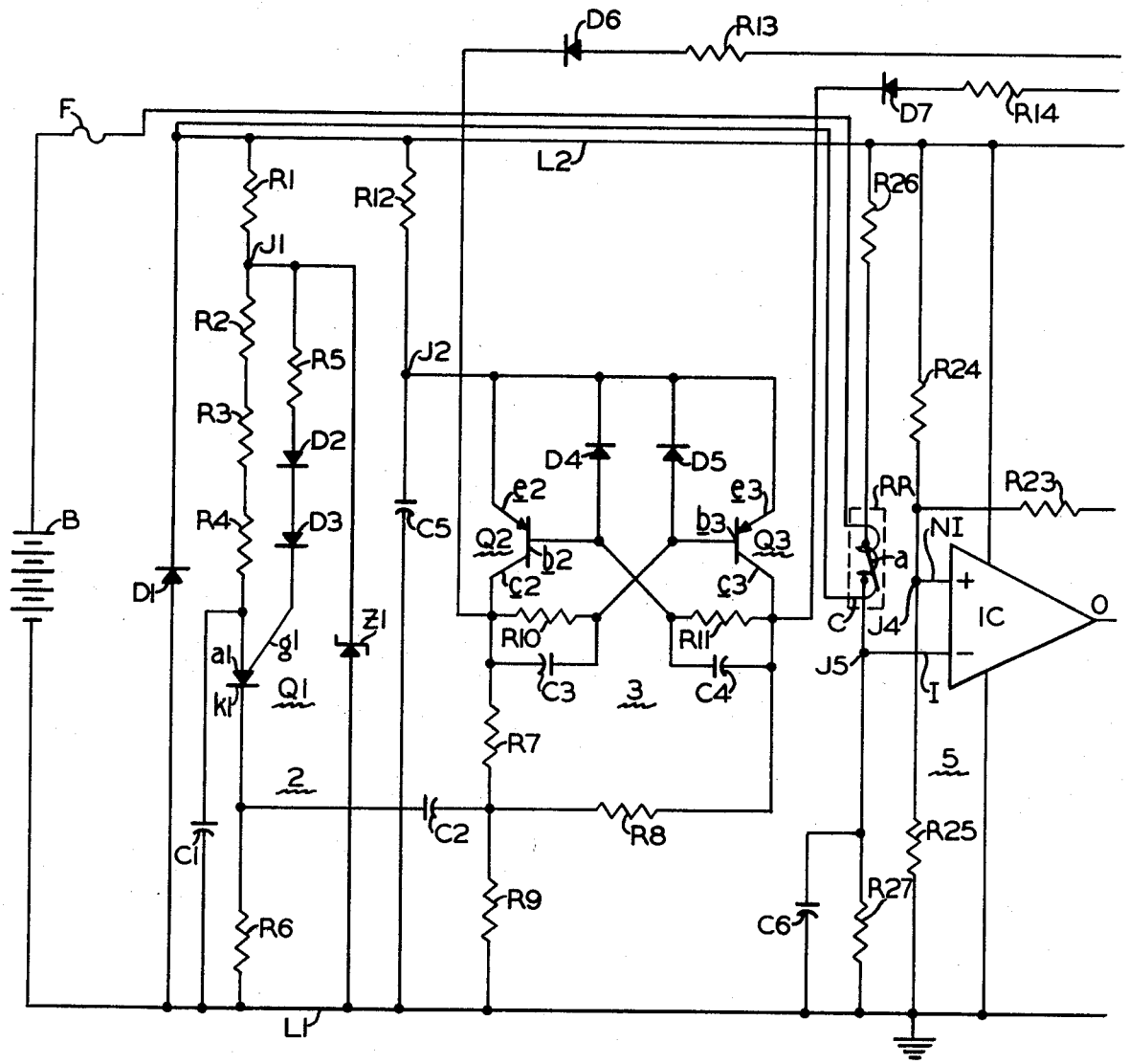
FIGS. 1A and 1B, when placed end to end, depict a schematic circuit diagram of the solid-state inverter circuit in accordance with the present invention.
Figure 1B:
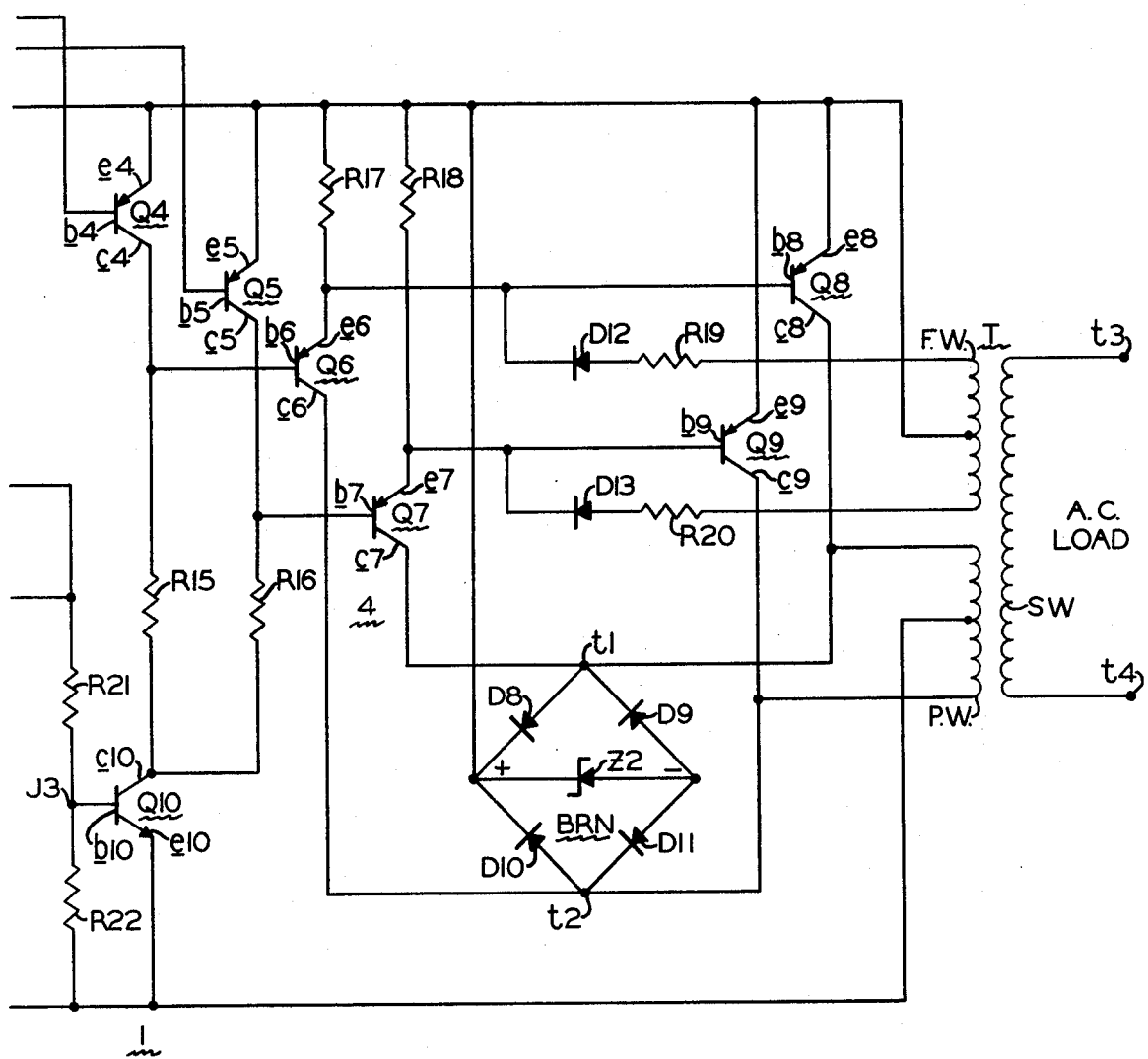

Referring now to the drawings and in particular to both FIGS. 1A and 1B, there is shown the electronic inverter or converter which is generally characterized by numeral 1 for converting a d.c. input voltage into an a.c. output voltage. As shown, the solid-state inverter includes a free-running programmed unijunction transistor oscillator 2, a bistable transistor multivibrator 3, a compound connected transistor amplifier 4 and an overload protection circuit 5. The electronic inverter 1 is powered by a suitable d.c operating voltage which may be provided by an appropriate storage battery B. As shown, a reverse battery protection circuit including diode D1 is connected to the battery B, through a fuse F and the coil C of an electromagnetic relay, the latter will be described in greater detail hereinafter. Thus, the anode electrode of diode D1 is connected to the reference potential or ground lead L1 while the anode electrode is connected to the positive potential supply lead L2.

The relaxation oscillating circuit 2 includes a programmed unijunction transistor Q1 having an anode electrode $a1$, a cathode electrode $k1$ and a gate electrode $g1$. A shunt regulator comprising resistor R1 and Zener diode Z1 is connected between leads L1 and L2 to provide immunity from the effects of power supply variations over the operating voltage range. The anode electrode $a1$ of unijunction transistor Q1 is connected to the junction J1 formed between resistor R1 and diode Z1 via series connected resistors R2, R3 and R4 while the cathode electrode $k1$ is connected to the ground lead L1 via resistor R6. A timing capacitor is connected from the anode electrode $a1$ to reference potential lead L1. The gate electrode $g1$ is connected to junction point J1 via series connected resistor R5 and negative temperature coefficient temperature compensating diodes D2, D3 which set the trip point of the unijunction transistor Q. The frequency of the a.c. oscillations produced by the free-running oscillator 2 is determined by the time constant (TC) of resistance R2, R3, R4 and capacitance C1. The a.c. oscillations from the relaxation oscillator 2 are derived from the cathode electrode $k1$ and are applied to the input of the bistable multivibrator 3 via coupling capacitor C2.

The bistable multivibrator or flip-flop 3 includes a pair of PNP transistors Q2 and Q3 connected in a common-emitter configuration. The first transistor Q2 includes an emitter electrode $e2$, a collector electrode $c2$ and a base electrode $b2$ while the second transistor Q3 includes an emitter electrode $e3$, a collector electrode $c3$ and a base electrode $b3$. The collector electrode $c2$ of transistor Q2 includes a load resistor R7 and the collector electrode $c3$ of transistor Q3 includes a load resistor R8 both of which are connected to ground lead L1 via resistor R9. The collector electrode $c2$ of transistor Q2 is also connected to the base electrode $b3$ of transistor Q3 by cross-coupling resistor R10 and by-pass capacitor C3 while the collector electrode $c3$ of transistor Q3 is also connected to the base electrode $b2$ of transistor Q2 by cross-coupling resistor R11 and by-pass capacitor C4. The emitter electrodes $e2$ and $e3$ are connected in common and are directly coupled to junction point J2 formed between resistor R12 and capacitor C5. The base electrode $b2$ is connected to junction point J2 via diode D4 while the base electrode $b3$ is connected to the junction point J2 via diode D5. As shown, a series connected resistor R12 and capacitor C5 are connected between common lead L1 and positive supply lead L2 and function as a decoupling means for preventing the flip-flop from being triggered by ripple voltages from battery B. It will be appreciated that the frequency of the a.c. output signals of the bistable multivibrator is a function of the a.c. input oscillations which trigger the flip-flop, and in fact, the frequency is a fraction, namely, one half (½) of the frequency of the input triggering pulses. As shown, the a.c. output signals are derived from the collector electrodes $c2$ and $c3$ and are applied to the input of the compound connected transistor amplifier 4.

It will be seen that the compound connected amplifier 4 includes a pair of input, a pair of intermediate and a pair of output stages. One of the input stages includes a PNP transistor Q4 having an emitter electrode $e4$, a collector electrode $c4$ and a base electrode $b4$ while the other input stage includes a PNP transistor Q5 having an emitter electrode $e5$, a collector electrode $c5$ and a base electrode $b5$. As shown, the output collector electrode $c2$ is connected to the input base electrode $b4$ via a series connected diode D6 and resistor R13 while the output collector electrode $c3$ is connected to the input base electrode $b5$ via a series connected diode D7 and resistor R14. The emitter electrodes $e4$ and $e5$ of transistors Q4 and Q5, respectively, are directly connected to the positive lead L2. The collector electrodes $c4$ and $c5$ are connected by resistors R15 and R16, respectively, to the collector electrode $c10$ of an NPN switching transistor Q10, the details of which will be described in greater detail hereinafter. The collector electrode $c4$ of input transistor Q4 is directly connected to base electrode $b6$ of an intermediate PNP transistor Q6 while the collector electrode $c5$ of input transistor Q5 is directly connected to the base electrode $b7$ of an intermediate PNP transistor Q7. The emitter electrode $e6$ of transistor Q6 is connected to lead L2 via resistor R17, and the emitter electrode $e7$ of transistor Q7 is connected to lead L2 via resistor R18. The collector electrode $c6$ of intermediate transistor Q6 is connected to terminal $t2$ of a bridge rectifying network BRN while the collector electrode $c7$ of intermediate transistor Q7 is connected to terminal $t1$ of bridge rectifier BRN. The bridge rectifying network BRN includes four diode rectifiers D8, D9, D10 and D11 each one of which is separately situated in one of the respective legs of the bridge and is appropriately poled to provide a positive and a negative d.c. terminal as shown in FIG. 1B. A voltage breakdown device, such as Zener diode Z2 is connected between the positive and negative d.c. terminals. Further, the positive d.c. terminal is directly connected to the lead L2. The function of the bridge rectifier BRN and Zener diode Z2 is to protect the amplifier and in particular, the germanium transistor power output stages against damage due to transients or surges which may be developed or appear in the load. The Zener diode Z2 limits the voltage level to the breakdown or avalanche voltage of the bridge rectifier network BRN.

As shown, each of the output stages includes a PNP germanium transistor. It will be seen that the emitter electrode $e6$ of transistor Q6 is directly connected to the base electrode $b8$ of output power transistor Q8 while the emitter electrode $e7$ of transistor Q7 is directly connected to the base electrode $b9$ of output power transistor Q9. The output collector electrode $c8$ is connected to the upper end of the center-tapped primary winding PW of transformer T while the output collector electrode $c9$ is connected to the lower end of the center-tapped primary winding PW. The center-tap of primary winding PW of transformer T is directly connected to ground lead L1. The emitter electrodes $e8$ and $e9$ of transistors Q8 and Q9, respectively, are directly connected to lead L2 and, in turn, to the center-tap of the feedback winding FW of output transformer T. The upper end of the feedback winding FW is connected to the base electrode $b8$ via series connected resistor R19 and diode D12 while the lower end of the feedback winding FW is connected to the base electrode $b9$ via series connected resistor R20 and diode D13. The output signals developed in the primary winding PW are induced into secondary winding SW. The a.c. output signals are derived from terminals $t3$ and $t4$ and are applied to a suitable a.c. load (not shown).

As previously mentioned, the collector electrodes $c4$ and $c5$ of the input amplifying transistors Q4 and Q5 are connected to the collector electrode $c10$ of switching transistor Q10 of the overload protection circuit 5 via resistors R15 and R16, respectively. During normal operation, the NPN switching transistor Q10 is turned on by integrated circuit operational amplifier IC so that a circuit path to ground is estabished through the collector-emitter electrodes $c10$–$e10$. As shown, the emitter electrode $e10$ is directly connected to ground lead L1 while the base electrode $b10$ is connected to the junction point J3 of a voltage divider network formed by series connected resistors R21 and R22. The upper end of resistor 21 is connected to output terminal O of operational amplifier IC while the lower end of resistor 22 is connected to ground lead L1. It will be noted that the operational amplifier IC has a pair of inputs I and NI and the single output O. The integrated circuit operational amplifier IC may be of the differential input signal type in that it functions on the difference of voltage of the signal levels that are applied to the two inputs. The operational amplifier may be of the type manufactured and sold by Fairchild Semiconductor Corporation of Mountainview, California, and designated as an A-741. It will be noted that an appropriate d.c. voltage terminal of the operational amplifier IC is directly connected to the positive supply lead L2, and that another d.c. voltage terminal is connected to the common or ground lead L1. As shown, the one of the two inputs is termed the noninverting or positive input NI while the other of the two inputs is termed the inverting or negative input I. The output terminal O is also connected to the noninverting input terminal NI via a positive or regenerative feedback resistor R23 to provide a hysteresis effect which requires that the input signal on the inverting input terminal I will rise above and will fall below the reference voltage level before the toggling action occurs. A voltage divider including resistors R24 and R25 is connected between positive voltage lead L2 and ground lead L1. The noninverting input terminal NI is connected to the junction point J4 formed between resistors R24 and R25 to provide a reference voltage. The inverting input terminal I is connected to the junction point J5 formed between resistor 26 and resistor 27. A by-pass capacitor C6 is coupled in parallel with the resistor 27. As shown, a normally opened electrical contact $a$ of an electromagnetic reed relay RR is interposed between junction point J5 and the lower end of the voltage dividing resistor R26. The reed relay RR is a commercially available device which includes an inductive coil C for magnetically influencing or attracting the sealed electrical contact member $a$ which may be formed of any suitable magnetic material having high electrical conductivity. The construction of the coil C and the number of turns is so arranged that during normal operation of the inverter 1, an insufficient amount of magnetic flux is produced by the average current drawn from the battery B to attract the reed contact $a$ so that the switch remains opened, as shown. Conversely, when an overload condition prevails, the increased current flow is sensed by the coil C, and the magnetic flux increases to a point where reed contact $a$ is attracted to close the switch contact $a$.

In describing the operation of the present electronic inverter, it will be assumed that the elements or components are intact and functioning properly, that the d.c. supply voltage and load are appropriately connected to the circuit and that no overload condition is present. Under this condition, the inverter is powered by the d.c. operating voltage of battery B so that a.c. oscillations are produced by the programmed unijunction transistor oscillator 2. As previously mentioned, the frequency or hertz (Hz) of the a.c. oscillations produced by oscillator 2 is dependent upon the RC time constant of capacitor C1 and resistors R2, R3 and R4 and may be varied by changing the capacitance and resistance values. The a.c. oscillations are coupled to the input of multivibrator 3 via capacitor C2 and are employed to trigger the transistors Q2 and Q3. The transistors Q2 and Q3 are rendered alternately conductive and nonconductive so that square-wave output pulses are developed on the respective electrodes $c2$ and $c3$. The square-wave signals produced on collector electrode $c2$ are conveyed to the input base electrode $b4$ of amplifying transistor Q4 via the series connected diode D6 and resistor R13 and, in turn, are amplified by intermediate transistor Q6 and output power transistor Q8. It will be seen that the output circuit of transistor Q8 includes the upper half of the center-tapped primary winding PW so that current flowing through the emitter-collector electrodes $e8$-$c8$ causes a voltage to be developed in the primary winding PW. This primary voltage induces a proportional amount of voltage to be developed in the feedback winding FW and in the secondary winding SW. The a.c. output voltage induced in secondary winding SW energizes the a.c. load connected across terminals $t3$ and $t4$ while the voltage developed in the feedback winding is rectified by diode D12 and is employed to positively ensure the turning off of the germanium power transistor Q9. In a like manner, the square-wave signals produced on collector electrode $c3$ are conveyed to the input base electrode $b5$ of amplifier transistor Q5 via series connected diode D7 and resistor R14 and, in turn, are amplified by intermediate transistor Q7 and output power transistor Q9. It will be seen that the output circuit of the transistor Q9 includes the lower half of the center-tapped primary winding PW so that current flowing through the emitter-collector electrodes $e9$-$c9$ causes a voltage to be developed in the primary winding PW. This primary voltage induces a proportional amount of voltage to be developed in the feedback winding FW and in the secondary winding SW. The a.c. output voltage developed across terminals $t3$ and $t4$ is used to energize the a.c. load while the voltage developed in the feedback winding FW is rectified by diode D13 and is employed to completely shut off the germanium transistor Q8. It will be appreciated that the a.c. output signals will continue to be developed across terminals $t3$ and $t4$ to energize the load as long as the circuit is functioning properly and no overload condition exists.

Now when an overload condition occurs, an excessive or abnormal amount of current will be demanded of the battery B. The increased current flow is sensed by the coil C of the reed relay RR, and an increased amount of magnetic flux is produced by the coil C so that the reed contact $a$ is attracted and is closed to serially interconnect resistor 26 with resistor 27 and capacitor 6. The current flowing through resistor R26, contact $a$ causes the capacitor C6 to begin charging. When the charge on capacitor C6 and the voltage at junction point J5 causes the inverting input terminal I to exceed the reference voltage on noninverting input NI, the operational amplifier IC toggles and turns off the switching transistor Q10. The non-conduction of transistor Q10 causes the interruption of the circuit path to ground for transistors Q4 and Q5. This effectively disables the multistage transistor amplifier 4 so that no a.c. output voltage is available at terminals $t3$ and $t4$ so that the load is abruptly and effectively deenergized. It will be appreciated that the operation of either the oscillator 2 or the multivibrator 3 is unaffected during the overload condition so that a.c. oscillations will always be immediately available for amplification by amplifier 4. The deenergization of the load by the disablement of the amplifier 4 causes a dramatic reduction in the load current demand which, in turn, causes a proportional diminution in the amount of current flowing through coil C. Obviously, the decrease in current flow through coil C causes a corresponding reduction in the magnetic flux produced by coil C and, in turn, causes a decrease in the attractive force on reed contact $a$. When the magnetic attraction decreases sufficiently, the resilient reed contact $a$ will open and will break the circuit between resistor R26 and resistor R27 and capacitor C6. Thus, the capacitor C6 begins to discharge through resistor R27, and when the voltage on junction point J5 falls below the reference voltage level on terminal NI, the operational amplifier IC toggles and turns on switching transistor Q10. The turning on of transistor Q10 reestablishes the circuit path to ground for amplifying transistors Q4 and Q5. Thus, the amplifier 4 is again activated, and the square-wave input signals received from multivibrator 3 are amplified and are transformer coupled to again energize the a.c. load which is connected across terminals $t3$ and $t4$.

If the overload condition is no longer present, the inverter 1 will continue to supply a.c. voltage to the load.

However, if the overload remains, the overload protection circuit 5 will again temporarily disable the amplifier 4 which in turn will cause the deenergization of the load. The cyclical operation of the energization and deenergization of the load by the overload protection circuit 5 and amplifier 4 will be repeated until the overload condition disappears by itself or is repaired by a maintainer. Thus, the presently described electronic inverter is efficiently and effectively protected against damage and destruction by overload conditions.

It will be appreciated that the details of the invention, which have been disclosed and described in the drawings and foregoing description, are to be considered as illustrative and not restrictive in nature. Accordingly, it is understood that various alterations may be made by persons skilled in the art without departing from the spirit and scope of this invention. Thus, it is apparent that numerous modifications and changes can be made to the presently described invention, and therefore, it is understood that all changes, equivalents and modifications producing the same results with substantially the features in substantially the manner as this invention are herein meant to be included in the appended claims.

Having now described the invention what I claim as new and desire to secure by Letters Patent, is:

1. In an electronic converter, means coupled to d.c. voltage for generating a.c. oscillations, means coupled to the oscillation generating means for producing a.c. signals having a frequency which is a function of the frequency of the a.c. oscillations, and means coupled to the signal producing means for amplifying said a.c. signals and for producing an a.c. output voltage characterized by relay coil means coupled to the d.c. battery source for continuously maintaining the energization of said oscillation generating means and said signal producing means for detecting the amount of current flowing therefrom, and relay contact means coupled to a comparator which is connected to said amplifying means for deenergizing said amplifying means thereby precluding the production of the a.c. output when an overload condition is sensed by said relay coil means.

2. In the electronic converter as defined in claim 1, wherein said relay coil means influences the opening and closing of said relay contact means.

3. In the electronic converter as defined in claim 2, wherein said relay contact means is coupled to the input of a comparator which controls the condition of a switching circuit.

4. In the electronic converter as defined in claim 3, wherein said switching circuit is coupled to the amplifying means for momentarily interrupting a circuit path to deenergize the amplifying means.

5. In the electronic converter as defined in claim 3, wherein a timing network is coupled to the input of said comparator to establish a period of time for toggling said comparator.

6. In the electronic inverter as defined in claim 2, wherein said relay coil and contact means is an electromagnetic reed relay.

7. In the electronic converter as defined in claim 3, wherein said comparator includes an operational amplifier and said switching circuit includes at least one transistor stage.

8. In the electronic converter as defined in claim 1, wherein a surge protector is coupled to the amplifying means to protect the amplifying means against surges.

9. An electronic inverter for converting a d.c. input into an a.c. output comprising, means coupled to a source of d.c. supply voltage for generating a.c. oscillations, means coupled to said oscillation generating means for producing a.c. signals having a frequency which is a fraction of the frequency of the a.c. oscillations, means coupled to said signal producing means for amplifying said a.c. signals for producing an a.c. output voltage, and relay means including an inductive coil coupled to the source of d.c. supply voltage for sensing the amount of current flowing therefrom and including contacts for disabling said amplifying means by toggling an operational amplifier and said inductive coil continuously maintaining the operation of said oscillation generating means and said signal producing means when the amount of current flowing from the source d.c. supply voltage exceeds a predetermined value.

10. The electronic inverter as defined in claim 9, wherein said inductive coil is coupled in series with the source of d.c. supply voltage.

11. The electronic inverter as defined in claim 10, wherein said inductive coil operates a movable electrical contact between an open and a closed position.

12. In the electronic inverter as defined in claim 9, wherein said operational amplifier includes an inverting and noninverting input and an output.

13. The electronic inverter as defined in claim 12, wherein a switching transistor is coupled to the output of said operational amplifier.

14. The electronic inverter as defined in claim 9, wherein said operational amplifier functions as a comparator circuit which assumes a first conductive condition when the current from the source of d.c. supply voltage is below the predetermined value and which assumes a second conductive condition when the current from the source of d.c. supply voltage exceeds the predetermined value.

15. The electronic inverter as defined in claim 9, wherein said inductive coil influences the opening and closing of a reed contact in response to the amount of current flowing from the source of d.c. supply voltage.

16. The electronic inverter as defined by claim 9, wherein said relay means is a reed relay having an electrical contact coupled to an input of an integrated circuit comparator which has its output coupled to a solid-state switching circuit.

17. The electronic inverter as defined in claim 9, wherein a surge protective circuit means including a rectifier network and a voltage breakdown device is coupled to said amplifying means for subduing voltage surges.

18. The electronic inverter as defined in claim 9, wherein said oscillating means includes a programmed unijunction transistor relaxation oscillator.

19. The electronic inverter as defined in claim 9, wherein said a.c. signal producing means includes a bistable transistor multivibrator.

20. The electronic inverter as defined in claim 9, wherein said amplifying means includes a plurality of cascaded transistor amplifier stages.

21. The electronic inverter as defined in claim 9, wherein an output transformer having a primary winding and a pair of secondary windings is coupled to said amplifying means.

* * * * *

UNITED STATES PATENT AND TRADEMARK OFFICE
CERTIFICATE OF CORRECTION

PATENT NO. : 4,079,444
DATED : March 14, 1978
INVENTOR(S) : John J. Kuhn

It is certified that error appears in the above-identified patent and that said Letters Patent are hereby corrected as shown below:

Column 9, line 22, after "voltage" insert --source--

Column 10, line 6, after "signals" insert --and-- line 14, after "source" insert --of--

Signed and Sealed this

Twenty-second Day of August 1978

[SEAL]

Attest:

RUTH C. MASON
Attesting Officer

DONALD W. BANNER
Commissioner of Patents and Trademarks